United States Patent
Castro et al.

(10) Patent No.: US 8,375,018 B2
(45) Date of Patent: Feb. 12, 2013

(54) OPEN TYPES FOR DISTRIBUTED SYSTEMS

(75) Inventors: Pablo Castro, Redmond, WA (US); Andrew Conrad, Sammamish, WA (US); Michael Flasko, Duvall, WA (US); Pratik Patel, Bothell, WA (US); Subramanian Muralidhar, Bellevue, WA (US); Marcelo Lopez Ruiz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 357 days.

(21) Appl. No.: 12/483,359

(22) Filed: Jun. 12, 2009

(65) Prior Publication Data

US 2010/0228749 A1 Sep. 9, 2010

Related U.S. Application Data

(60) Provisional application No. 61/157,486, filed on Mar. 4, 2009.

(51) Int. Cl.
  *G06F 7/00* (2006.01)
  *G06F 17/30* (2006.01)
(52) U.S. Cl. .................. 707/706; 707/770
(58) Field of Classification Search .......... 707/600–831; 709/203, 217, 219
  See application file for complete search history.

(56) References Cited

U.S. PATENT DOCUMENTS

| | | | | |
|---|---|---|---|---|
| 6,356,907 B1 * | 3/2002 | Hopmann | ................. | 1/1 |
| 6,633,923 B1 | 10/2003 | Kukura et al. | | |
| 7,093,261 B1 | 8/2006 | Harper et al. | | |
| 7,493,341 B2 | 2/2009 | Israel et al. | | |
| 7,702,687 B2 * | 4/2010 | Govindarajan et al. | ....... | 707/770 |
| 2003/0009572 A1 | 1/2003 | Thurner | | |
| 2004/0010519 A1 | 1/2004 | Sinn et al. | | |
| 2006/0230184 A1 | 10/2006 | Velline et al. | | |
| 2008/0222201 A1 | 9/2008 | Chen et al. | | |
| 2008/0222652 A1 | 9/2008 | Lambert et al. | | |
| 2009/0063512 A1 | 3/2009 | Cheah | | |
| 2010/0125844 A1 | 5/2010 | Mousseau et al. | | |
| 2010/0146036 A1 | 6/2010 | Castro et al. | | |
| 2010/0153862 A1 | 6/2010 | Schreiber | | |

OTHER PUBLICATIONS

Skillicorn, Structuring data parallelism using categorical data types, 1993, IEEE, 110-115.*
Widener, et al. , "Open Metadata Formats: Efficient XML-Based Communication for Heterogeneous Distributed Systems", Retrieved at <<http://ieeexplore.ieee.org/stamp/stamp.jsp?arnumber=00919013>>, 2001 IEEE, pp. 739-742.
Mahmoud, Qusay H. , "Getting Started with Data Synchronization Using SyncML", Retrieved at <<http://developers.sun.com/mobility/midp/articles/syncml/>>, Sun Microsystems, Inc., Sep. 2004, pp. 1-7.
Shklar, et al. , "InfoHarness: Use of Automatically Generated Metadata for Search and Retrieval of Heterogeneous Information", Retrieved at <<http://www.cs.rutgers.edu/~shklar/papers/caise95.ps>>, pp. 14.

* cited by examiner

*Primary Examiner* — Jean B Fleurantin

(57) ABSTRACT

Techniques for exchanging data are provided herein. An "open" data type is established on a computer system to define the structure of data. The open data type includes one or more predefined properties, and enables one or more extension properties to be optionally included. Data that is defined according to the open data type includes data values for the predefined properties, and may optionally include data values for extension properties. A second computer system may consider the extension properties to be extension properties or predefined properties of a data type known at the second computer system. In this manner, the type system that is used to exchange data between nodes need not necessarily be commonly known among the nodes, and/or may be dynamically modified, even for a particular data instance. Furthermore, queries may be performed against the data that query against the predefined properties and/or extension properties.

20 Claims, 10 Drawing Sheets

OPEN TYPES FOR DISTRIBUTED SYSTEMS

This application claims the benefit of U.S. Provisional Application No. 61/157,486, filed on Mar. 4, 2009, which is incorporated by reference herein in its entirety.

BACKGROUND

A database is a structured collection of records or data. A database is typically stored at a computer system, and may be accessed by other computer systems through the computer system. For example, a first computer system, which may be referred to as a "client," may include a "client agent" configured to request data. The client agent may request data from a "server agent" located at a second computer system (a "server") that maintains the data in storage in an associated database.

An example of a distributed system of computers where data may be exchanged is a service-oriented architecture (SOA) system. A SOA infrastructure allows different applications to exchange data with one another as they participate in business processes. Service-orientation aims at a loose coupling of services with operating systems, programming languages and other technologies which underlie the different applications. Another example of a distributed system of computers in which data may be exchanged is a REST (Representational Estate Transfer) system. A REST infrastructure allows data to be exchanged between computer systems according to a protocol (e.g., hypertext transfer protocol (HTTP)) without an additional message layer.

When data is exchanged in distributed systems there is an expectation by the participating nodes (e.g., computer systems) regarding the shape or structure of the exchanged data. In some cases, the data is self-describing (e.g., the data includes structure information regarding the data), and in other cases, the data is structured according to a known format or "contract" that is agreed-upon and known by the participating nodes. Distributed systems that follow well established architectural styles, such as SOA and/or REST systems, typically structure exchanged data according to known formats. As such, the nodes at the ends of a data exchange are assumed to know how to interpret various representations of exchanged data, provided that a "name" for a "type" of the data that is exchanged is known. In a SOA system, this information is frequently provided in the form of data types described in WSDL documents. In REST systems, this information is provided as the Multipurpose Internet Mail Extensions (MIME) type for a given resource representation. This ability to interpret data according to known data types is particularly important in business applications that tend to focus on structured records carrying well-known data, and that need to preserve full fidelity as the data travels through the system.

However, the requirement for the use of known data types introduces increased coupling between nodes in a data exchange system. For example, the requirement for known data types does not allow the nodes exchanging data to dynamically modify the format of the data once the system has been deployed. Furthermore, this requirement causes difficulties with different versioning speeds in clients and servers, and does not allow nodes of a system to be developed when data types to be exchanged by the system are not known and/or may possibly never be known.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are described herein for enabling structured data to be exchanged in a more flexible manner than according to conventional techniques. An "open" data type may be established on a computer system to define the structure of data. The open data type includes zero or more predefined, static properties, and enables one or more extension properties to be optionally included. Data that is defined according to the open data type includes data values for the predefined properties, and may optionally include data values for one or more extension properties. Data may be received from a second computer system that has added data values for one or more extension properties to the data. The second computer system may define the extension properties as extension properties or as predefined properties of a data type known at the second computer system. In this manner, the type system that is used to exchange data between nodes in a data exchange system need not necessarily be commonly known among the nodes, and/or may be dynamically modified, even for a particular data instance.

In one implementation, a method for exchanging data is provided. A first data type is associated with a request for a resource. The first data type is an open data type that includes a plurality of properties. The request for the resource is transmitted from a first computer system to a second computer system. The resource is instantiated at the second computer system according to a second data type that includes the plurality of properties and an additional property. The resource is received at the first computer system from the second computer system. The received resource is materialized into an instance of the first data type. The materialized instance includes a plurality of name/value pairs corresponding to the plurality of properties and a name/value pair associated with the additional property. The instance of the first data type is stored in a database.

Furthermore, a query that includes the extension property as a query parameter may be received. The query may be applied to the database to generate a query result. The query result may include zero or more instances that includes a data value for the extension property. The query result may be transmitted in response to the received query.

Still further, a request for the resource may be received from a third computer system. The resource is retrieved from storage by retrieving the plurality of name/value pairs corresponding to the plurality of properties from storage, and retrieving the name/value pair associated with the extension property from storage. The resource is transmitted to the third computer system in response to the request, including transmitting the plurality of name/value pairs corresponding to the plurality of properties and the name/value pair associated with the extension property.

The second data type may be an open data type or a conventional (non-open) data type. Furthermore, the second data type may be known or unknown to the first computer system.

In another implementation, a first computer system is provided. The first computer system includes a data request module and a materialization module. The data request module is configured to receive a request for a resource. The request has an associated first data type. The first data type is an open data type that includes a plurality of properties. The resource is instantiated at a second computer system according to a second data type that includes the plurality of properties and an additional property. The materialization module receives the resource from the second computer in response to the request being transmitted from the first computer system. The materialization module is configured to materialize the received resource into an instance of the first data type that includes a plurality of name/value pairs corresponding to the plurality of properties and a name/value pair associated with the additional property.

The first computer system may further include storage. The instance of the first data type may be stored in a database in the storage. The name/value pair is stored in the database as an extension property to the open data type.

Furthermore, the first computer system may include a query module. The query module is configured to receive a query that includes properties, such as one or more extension properties and/or one or more predefined properties, as query parameters and to apply the query to the database to generate a query result. The issuer of the query (e.g., a client) does not necessarily know which properties are considered extension properties and/or predefined properties. The query result may include zero or more instances of the first data type that includes a data value for the extension property.

Still further, the first computer system may include a data response module. The data response module is configured to receive a request for the resource from the third computer system, to retrieve the resource from storage, and to transmit the resource to the third computer system in response to the request for the resource received from the third computer system. The data response module is configured to transmit the plurality of name/value pairs corresponding to the plurality of properties and the name/value pair associated with the extension property to the third computer system.

Computer program products are also described herein that enable data communications and queries with regard to open data types, client agents, and server agents, and further embodiments as described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
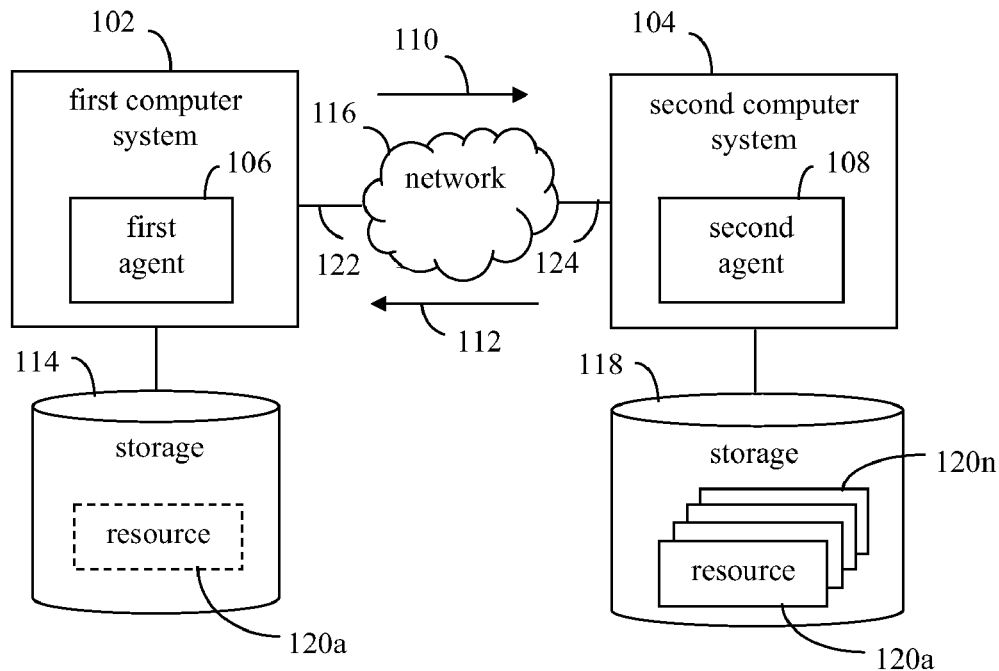
FIG. 1 shows a block diagram of a data communication system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

II. Example Embodiments

Embodiments of the present invention relate to data communications in distributed systems. For example, FIG. 1 shows a block diagram of a data communication system 100, according to an example embodiment. As shown in FIG. 1, system 100 includes a first computer system 102, a second computer system 104, a first storage 114, a network 116, and a second storage 118. First computer system 102 includes a first agent 106 (e.g., client agent), and second computer system 104 includes a second agent 108 (e.g., server agent). Storage 114 is coupled to first computer system 102. Storage 118 is coupled to second computer system 104. First and second computer systems 102 and 104 are communicatively coupled by network 116. First and second computer systems 102 and 104 may be computer systems in a distributed system of computers, such as a service-oriented architecture (SOA) system, a REST (Representational Estate Transfer) system, or other type of system. System 100 is configured to enable data exchanges between first and second computer systems 102 and 104. These elements of system 100 are described as follows.

First and second computer systems 102 and 104 may each be any type of computing device, including a desktop computer (e.g., a personal computer), a server, a mobile computer or computing device (e.g., a Palm® device, a RIM Blackberry® device, a personal digital assistant (PDA), a laptop computer, a notebook computer, etc.), or other type of computer system.

Storage 114 and storage 118 may each include one or more of any type of storage mechanism to store content (e.g., objects), including a hard disk drive, an optical disc drive, a memory device such as a RAM device, a ROM device, etc., and/or any other suitable type of storage medium. Storage 114 and storage 118 may include long term storage (e.g., a hard disk drive) or temporary storage (e.g., a RAM device).

Network 116 may include one or more communication links and/or communication networks, such as a PAN (personal area network), a LAN (local area network), a WAN (wide area network), or a combination of networks, such as the Internet. First and second communication links 122 and 124, which respectively couple first and second computer systems 102 and 104 to network 116, may include any number of communication links, including wired and/or wireless links, such as IEEE 802.11 wireless LAN (WLAN) wireless links, Worldwide Interoperability for Microwave Access (Wi-MAX) links, cellular network links, wireless personal area network (PAN) links (e.g., Bluetooth™ links), Ethernet links, USB links, etc. Note that in an embodiment, agents 106 and 108 may be included in a same computer system. In such an embodiment, network 116 may not need to be present.

First agent 106 is configured to perform a request for data for first computer system 102. For instance, first agent 106 may generate a request for a resource that is accessible at second computer system 104, which is transmitted from first computer system 102 in a first communication signal 110. First communication signal 110 is transmitted from first computer system 102 through a first communication link 122, network 116, and a second communication link 124, to second computer system 104. First communication signal 110 may be transmitted in any form, including in the form of a stream of packets (e.g., IP packets). Second computer system 104 receives first communication signal 110.

Second agent 108 processes the request received in first communication signal 110. For example, the request received from first agent 106 may be for a resource 120a (e.g., of a plurality of resources 120a-120n) stored in storage 118 associated with second computer system 104. Second agent 108 retrieves resource 120a from storage 118 to include in a response. In an embodiment, resource 120a may be structured data defined by a data type. Data types are well known to persons skilled in the relevant art(s). A data type typically includes a name and a structure, which may be defined by a set of one or more properties. A data type may also include a behavior. For purposes of brevity, behaviors are not further described herein, but may be present in some data types. Data types represent structured types of data that are processible by associated applications.

Figure 2:
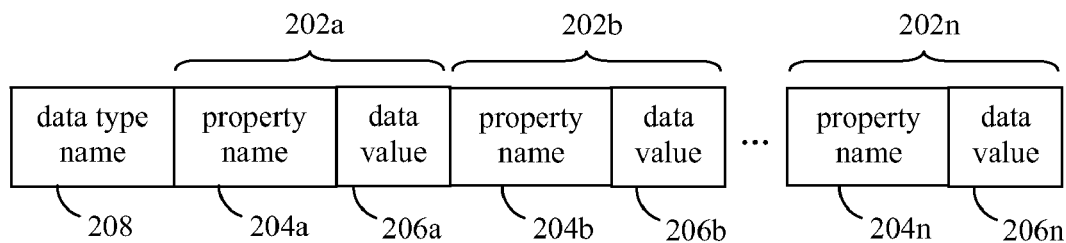
FIG. 2 shows a block diagram of an example resource.

For example, FIG. 2 shows a block diagram of a resource 200 or data item, which is an example of resource 120a. Resource 200 is structured according to a data type, indicated by a data type name 208, such as "Employee" (e.g., when the data type is used to represent employee data) or other name, which may be descriptive of a structure of the included data. As shown in FIG. 2, resource 200 has a structure defined by a set of properties 202a-202n. Resource 200 may include one or more properties 202. As shown in FIG. 2, properties 202a-202n are each expressed as a name/value pair, each name/value pair including a corresponding property name 204 and a data value 206. Data value 206 may include a value and an associated type (e.g., integer, string, date, etc.)). For example, property 202a includes a property name 204a and a data value 206a, and property 202b includes a property name 204b and a data value 206b. Each property name 204 has a value that is a name for the corresponding property 202, and the corresponding data value 206 is a data value for the property 202 in resource 200. For instance, in an example where data type name 208 for resource 200 is "employee," property name 202a may be "name," and data value 202b may be "Tom Smith," property name 202b may be "birth date," and data value 202b may be "1976-08-27," and a property name 202c may be "office number," and data value 202c may be "B1078."

Referring back to FIG. 1, second agent 108 may convert resource 120a from its particular data type to a data format that may be transmitted from computer system 104 (e.g., a wire format), as would be known to persons skilled in the relevant art(s). Second computer system 104 generates a second communication signal 112, which is a response signal that includes the requested resource and includes an indication of the data type used for resource 120a at second computer system 104. Second communication signal 112 is transmitted through second communication link 124, network 116, and first communication link 122, and is received by first computer system 102. Second communication signal 112 may be transmitted in any form, including in the form of a stream of packets (e.g., IP packets).

First agent 106 processes resource 120a received in second communication signal 112. In a conventional data communication environment, first agent 106 converts the received version (e.g., wire format) of resource 120a to the indicated data type in which resource 120a was formatted at second computer system 104. This is because in conventional data communication systems, first and second agents 106 and 108 use the same data types (e.g., data types that match in name and in structure) to represent data. Thus, in an example where resource 120a has the "Employee" data type at second computer system 104, first and second computer systems 102 and 104 contain a common definition of the "Employee" data type, and resource 120a is also assigned the "Employee" data type at first computer system 102. First agent 106 may optionally store the received resource 120a in storage 114 (as indicated by dotted lines in FIG. 1) (e.g., permanently, temporarily, and/or transiently stored in storage).

Such conventional data communications have deficiencies due to the need to use common data types among different distributed computer systems. When agents in a system exchange data, each agent preferably represents that data as instances of data types that are known to the other agents. A consistency in data types at the agents typically must be maintained. For example, each agent typically maintains a common set of properties for a particular data type. This consistency enables the development environment to validate the structure and constraints of the data, as well as assist the developer through the knowledge of those types. However, extensive use of common data types introduces increased coupling between agents in a data communication system. One of the challenges of this approach is that pre-definition of types has the effect of fixing the set of attributes or "properties" that each type has. Once all the nodes participating in the system have knowledge about those types, changing the definition of the type in one of the nodes would either cause other nodes to fail or to not be able to make use of the new information included in the change until the system is modified and re-deployed.

Embodiments of the present invention overcome such deficiencies in conventional data communication systems, enabling flexibility in data types across different distributed computer systems. Examples of such embodiments are described below.

III. Example Embodiments

Embodiments of the present invention enable computer systems to exchange data in a flexible manner through the use of "open data types". Embodiments are provided that enable interacting nodes (typically a client and a server) in distributed systems to exchange structured data where the type system defining the structure may not be known and/or may be dynamically modified, even for a given instance. Embodiments enable the nodes of the system to independently have incomplete knowledge of the type system and/or to dynamically modify the type system. The example embodiments described herein are provided for illustrative purposes, and are not limiting. Furthermore, additional structural and operational embodiments, including modifications/alterations, will become apparent to persons skilled in the relevant art(s) from the teachings herein.

In an embodiment, a client and server can each independently allow for some or all of their types to not be known. A message exchanged between a client and a server may have a consistent format independent of whether metadata of the types in the message are known by either node. Queries may be represented uniformly, regardless of whether metadata associated with queried data is known. Changes to data may be represented uniformly, regardless of whether metadata associated with the data is known. In an embodiment, client and server type systems can independently modify metadata of a type, even for a specific instance, without needing to modify the system interfaces.

Figure 3:
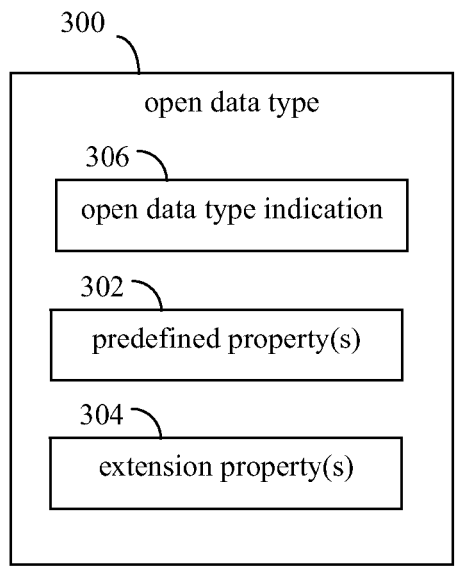
FIG. 3 shows a block diagram of an open data type, according to an example embodiment.

For example, FIG. 3 shows a block diagram of an open data type 300, according to an example embodiment. As shown in FIG. 3, open data type 300 includes an open data type indication 306, one or more predefined properties 302, and enables one or more extension properties 304 to be present. A resource may be structured according to open data type 300 in a similar manner as resource 200 shown above, except that the resource will include one or more predefined properties defined by predefined properties 302 in open data type 300, and may optionally include one or more extension properties.

Figure 4:
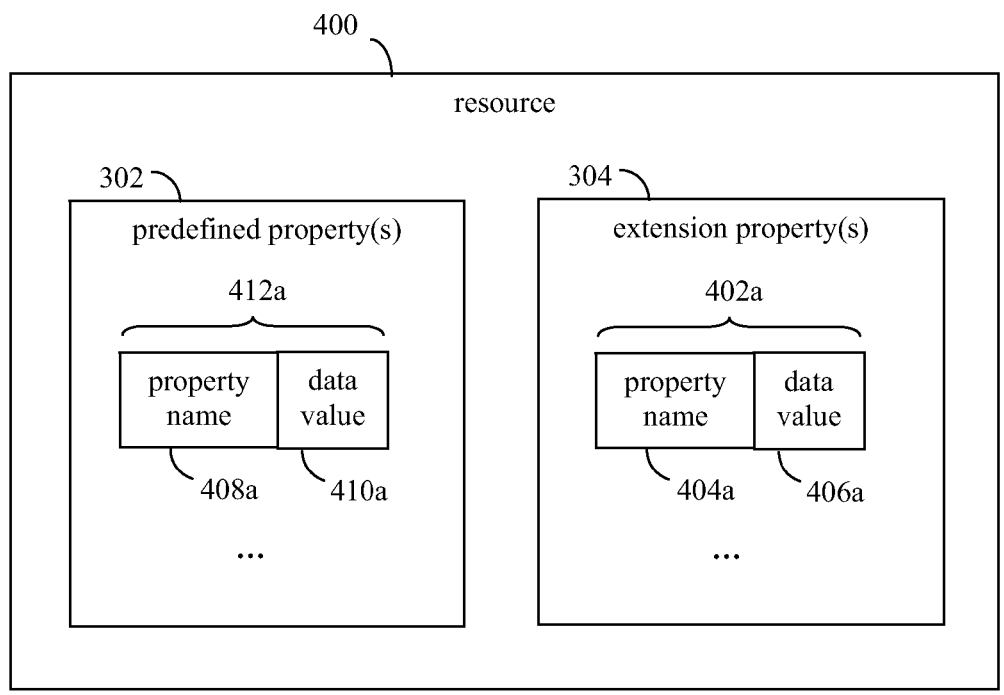
FIG. 4 shows a block diagram of a resource or data item structured according to an open data type, according to an example embodiment.

For example, FIG. 4 shows a block diagram of a resource 400 (e.g., data; a data item). Resource 400 is structured according to an open data type, such as open data type 300. Resource 400 may include a data type name (e.g., data type name 208), predefined properties 302, and may optionally include extension properties 304. Predefined properties 302 includes zero or more predefined or static properties 412 that are each expressed as a name/value pair, each name/value pair having a property name 408 and a data value 410 (e.g., a predefined property 412a that includes a property name 408a and a data value 410a). Extension properties 304 are enabled to be present in resource 400 because the data type of resource 400 is an open data type. Extension properties 302 includes one or more extension properties 402 that are each expressed as a name/value pair, each name/value pair having a property name 404 and data value 406 (e.g., property 402a that includes a property name 404a and a data value 406a). Similarly to resource 200 described above, each predefined property 412 and extension property 402 may be a primitive type (e.g., integer, string, date) or another structured type (e.g., an address, which in turn has "street," "zip," and "state" primitive types).

Open data type 300 enables distributed systems to have both structured data typing, and enables distributed systems to defined structured data types with an arbitrary amount of open properties. For example, resources defined according to open data type 300 may be provided with per-instance custom properties (extension properties 304) in addition to predetermined properties 302. Furthermore, open data type 300 enables nodes in a data exchange system to be changed independently from each other.

Figure 5:
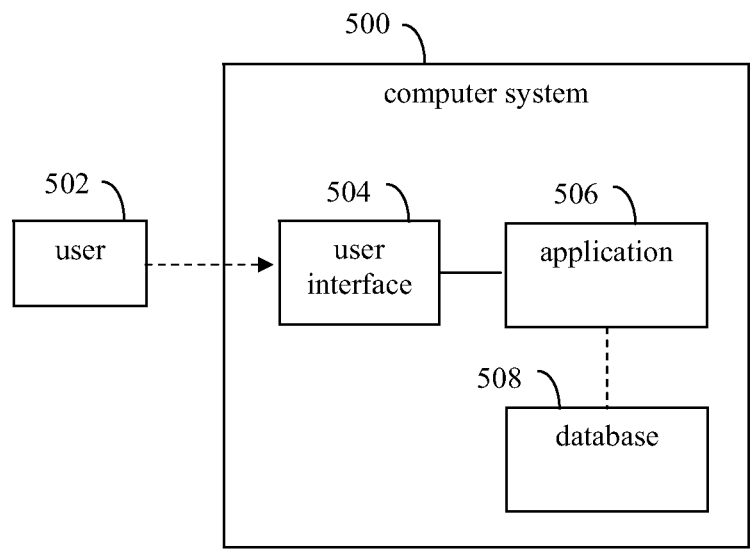
FIG. 5 shows a block diagram of a computer system at which a user agent may define an open data type, according to an example embodiment.

User agents may be enabled to define open data types. For instance, FIG. 5 shows a block diagram of a computer system 500 at which a user 502 may define an open data type, according to an example embodiment. As shown in FIG. 5, computer system 500 includes a user interface 504, an application 506, and a database 508. Application 506 may be a computer application (e.g., a software program) that interacts with typed data. Database 508 may be a database that stores typed data for application 506. For example, database 508 may be stored in storage associated with computer system 500. User 502 may interact with user interface 504, which is coupled to application 506, to configure an open data type. In embodiments, user 502 may be any type of user agent, including human users, non-human agents (e.g., a web-based program/application), etc. Thus, in embodiments, user interface 504 may be an interface for a human, for a program/application (e.g., an API (application programming interface)), or other type of interface.

Figure 6:
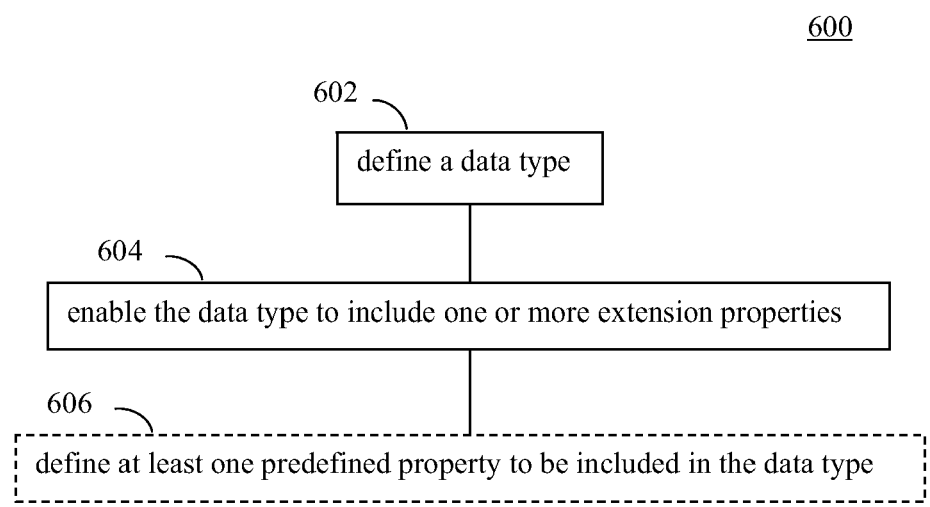
FIG. 6 shows a flowchart for configuring an open data type, according to an example embodiment.

An open data type may be configured in various ways. For instance, FIG. 6 shows a flowchart 600 for configuring an open data type, according to an example embodiment. Further structural and operational embodiments will be apparent to persons skilled in the relevant art(s) based on the discussion regarding flowchart 600. Flowchart 600 is described as follows.

In step 602, a data type is defined. For example, referring to FIG. 5, user 502 may interact with user interface 504 to define a new data type to be an open data type, or to modify an existing data type to be an open data type. For instance, user 502 may enter information textually into user interface 504 and/or user interface 504 may provide a graphical user interface (GUI), an editor (e.g., an XML or other programming language editor that edits a configuration file), or other interface configured to enable data types to be configured. The GUI may provide a check box, or other feature, to enable user 502 to indicate that a data type being defined is an open data type (which is maintained as open data type indication 306 in FIG. 3). User interface 504 may include any number and combination of user interface elements, such as a keyboard, a thumb wheel, a mouse pointer, a roller ball, a stick pointer, a display, any number of virtual interface elements, a voice recognition system, and/or other user interface elements described elsewhere herein or otherwise known.

In step 604, the data type is enabled to include one or more extension properties. Step 604 may be an independent step, or may be performed by performing step 602. For example, by defining a data type as an open data type, the open data type is enabled to include one or more extension properties, such as shown in FIG. 3 as extension properties 304. User 502 or subsequent users of the open data type may add one or more extension properties to the open data type, including defining a property name and primitive type of data (e.g., integer, string, date/time, etc.) for each extension property.

In step 606, at least one predefined property is defined to be included in the data type. Step 606 is optional, because an open data type need not necessarily include predefined properties. An open data type that does not include any predefined properties may also be referred to as a "fully open data type." For example, referring to FIG. 5, user 502 may define one or more predefined properties to be included in the open data type, such as shown in FIG. 3 as predefined properties 302. For each property, a property name and a primitive type of data for the property (e.g., integer, string, date/time, etc.) may be defined. In this manner, an open data type is formed, such as open data type 300 shown in FIG. 3.

For example, open data type 300 may be formed or generated according to flowchart 600 as an open data type declaration that includes a data type name, an open data type indication, and one or more property definitions for predefined properties 302. A data type declaration may be formed as text and/or according to any suitable code (e.g., .NET framework languages such as C# and Visual Basic, schema languages such as Conceptual Schema Definition Language (CSDL) which is used to create Entity Data Model (EDM) schemas, etc.), as desired for a particular application. For instance, a C# programming language form of data type declaration may be expressed, as follows:

```
[open] public class ClientPerson
{
  public int ID { get; set; }
  public string Name { get; set; }
  public int YearsOfExperience { get; set; }
}
``` where "ClientPerson" is the declared data type name, "[open]" indicates that the data type is open, and three property definitions for three predefined properties 302 are included. A first property definition has a property name of "ID" and a property type of "int" or integer. A second property definition has a property name of "Name" and a property type of "string." A third property definition has a property name of "YearsOfExperience" and a property type of "int."

Figure 7:
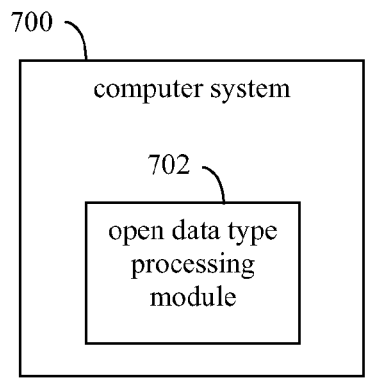
FIG. 7 shows a block diagram of an open data type processing module, according to an example embodiment.

Computer systems 102 and 104 may be configured to accommodate open data types in various ways. For instance, FIG. 7 shows a block diagram of an open data type processing module 702 included in a computer system 700, according to an example embodiment. Open data type processing module 702 is configured to enable computer system 700 to process resources according to open data types, according to embodiments. For example, in an embodiment, computer system 700 may recognize a data type as an open data type. Open data type processing module 702 enables computer system 700 to request and/or receive resources from other computer systems that include extension properties to the open data type. Furthermore, open data type processing module 702 may enable computer system 700 to receive and process requests for resources that include extension properties to the open data type. Still further, open data type processing module 702 may enable computer system 700 to receive queries that refer to extension properties to the open data type, and/or to apply the queries to a database that stores resources that include extension properties to the open data type. Computer systems 102 and/or 104 may be configured similarly to computer system 700 to be enabled to accommodate open data types, in embodiments.

Example embodiments for exchanging data configured according to open data types are described in the following subsections.

Figure 8:
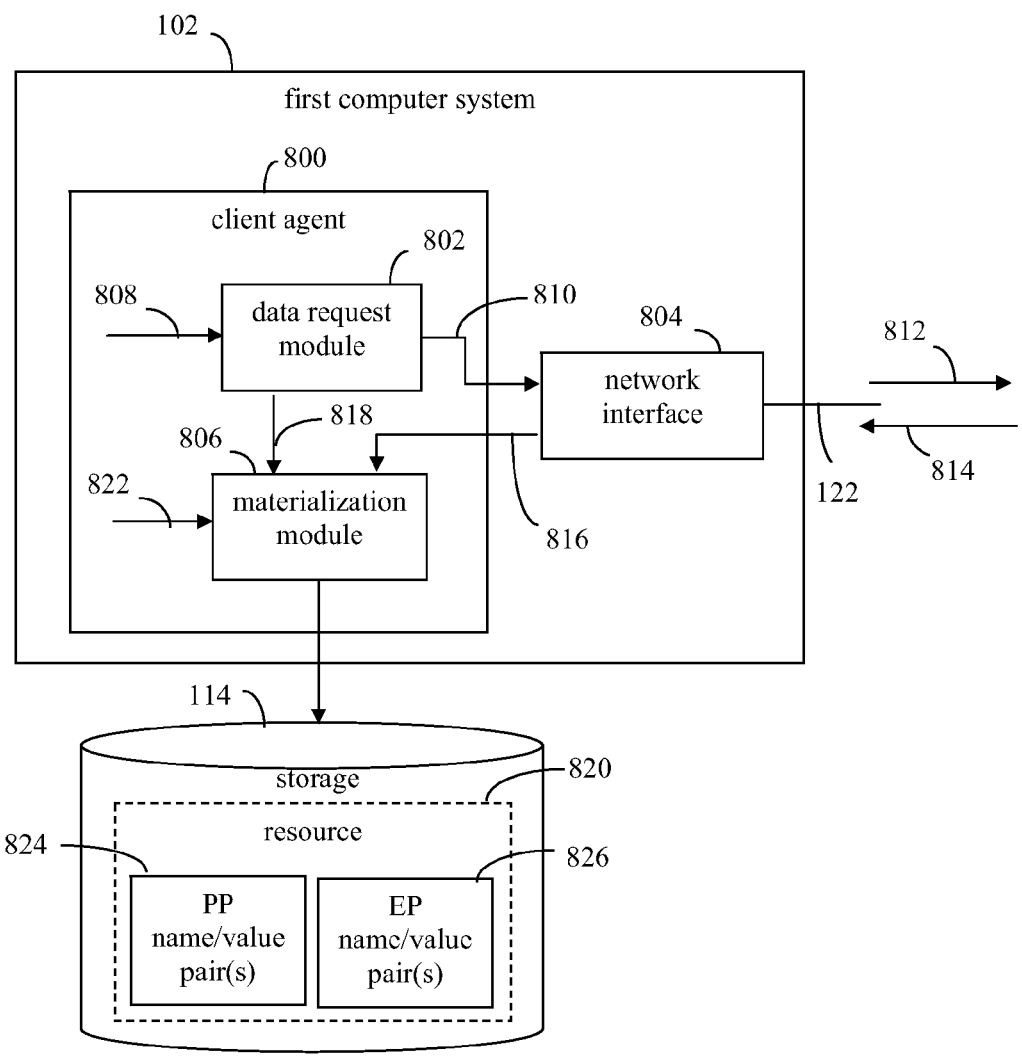
FIG. 8 shows a block diagram of a computer system configured to request data, according to an example embodiment.
Figure 9:
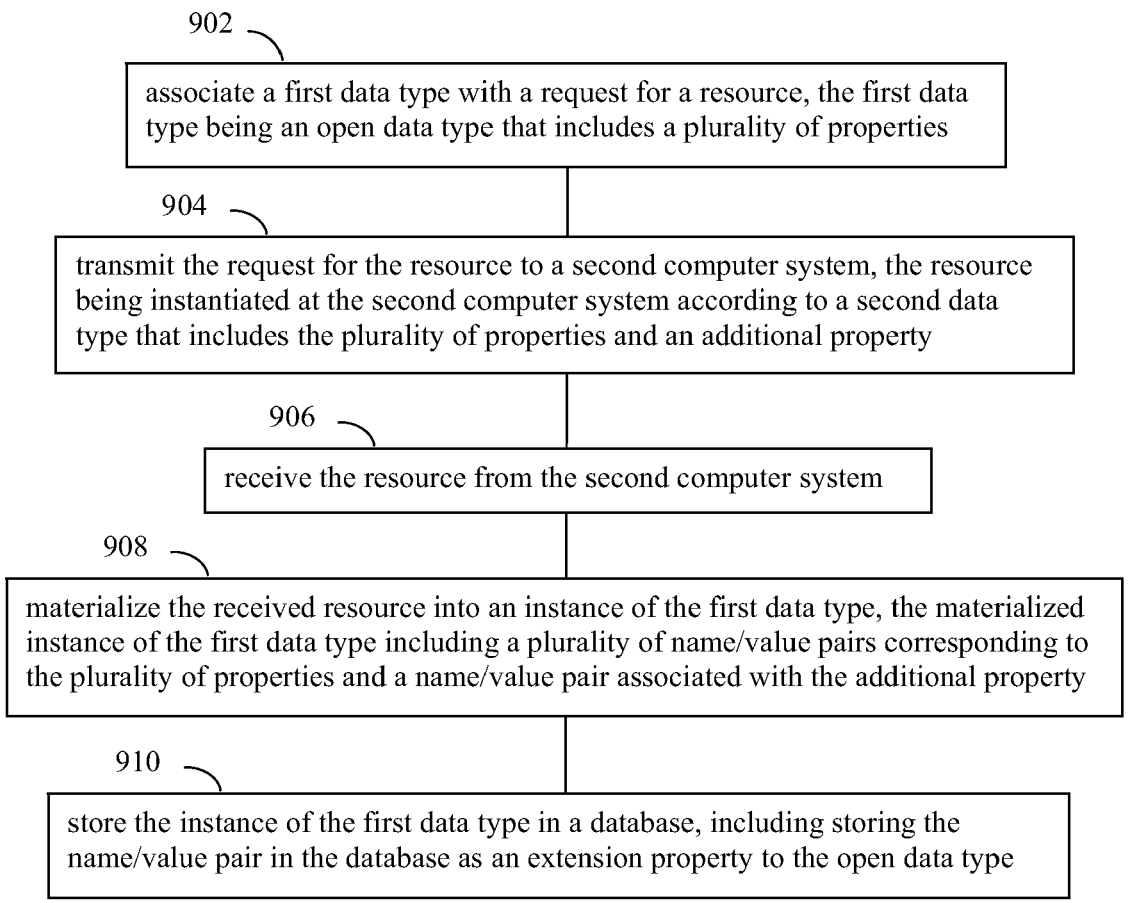
FIG. 9 shows a flowchart for communications involving open data types between first and second computer systems, according to an example embodiment.

A. Example Embodiments for Resources Materialized as Instances of Open Data Types FIG. 8 shows a block diagram of first computer system 102, according to an example embodiment of the present invention. As shown in FIG. 8, first computer system 102 includes a client agent 800 and a network interface 804. Client agent 800 is an example of open data type processing module 702. Client agent 800 is configured to enable first computer system 102 to request resources from second computer system 104, including resources configured according to open data types. As shown in FIG. 8, client agent 800 includes a data request module 802 and a materialization module 806. Client agent 800 is described with respect to FIG. 9. FIG. 9 shows a flowchart 900 for a data communication between a first agent (e.g., client agent 800) and a second agent (e.g., such as second agent 108 of FIG. 1), according to an example embodiment. Further structural and operational embodiments will be apparent to persons skilled in the relevant art(s) based on the discussion regarding flowchart 900. Flowchart 900 is described as follows.

In step 902, a first data type is associated with a request for a resource, the first data type being an open data type that includes a plurality of properties. As shown in FIG. 8, data request module 802 receives a request 808. Request 808 is a request for a resource at second computer system 104. Request 808 may have been generated by an application or other module operating at first computer system 102. In an embodiment, a first data type that is available at first computer system 102 is associated with request 808. The first data type is an open data type, such as open data type 300 shown in FIG. 3. As shown in FIG. 3, open data type 300 includes one or more predefined properties 302 and may include one or more extension properties 304. Note that although described as a request for a resource, request 808 may alternatively be an insert operation, an update operation, a delete operation, a replace operation, a merge operation, and/or other type of operation.

Figure 10:
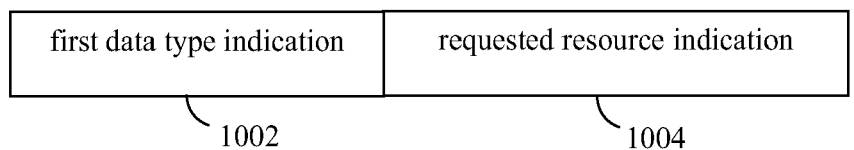
FIG. 10 shows a block diagram of a request for a resource, according to an example embodiment.

Referring back to FIG. 8, request 808 may have any suitable form. For instance, FIG. 10 shows a block diagram of a request 1000, according to an example embodiment. As shown in FIG. 10, request 1000 includes a first data type indication 1002 and a requested resource indication 1004. Data type indication 1002 indicates a target data type for materializing the requested resource indicated by requested resource indication 1004 when received at client agent 800, which in the current example is the first data type (an open data type).

Data request module 802 is optionally present. When present, data request module 802 is configured to convert request 808 to a network-transportable request 810, which has a network-transportable form (e.g., wire format). In an embodiment, network-transportable request 810 indicates the requested resource (e.g., includes requested resource indication 1004 of FIG. 10), but does not indicate the first data type. When data request module 802 is not present, request 808 may be directly received by network interface 804.

Referring back to FIG. 9, in step 904, the request for the resource is transmitted to a second computer system, the resource being instantiated at the second computer system according to a second data type that includes the plurality of properties and an additional property. As shown in FIG. 8, network-transportable request 810 is received by network interface 804. Network interface 804 is configured to transmit request 810 in a first communication signal 812. For example, similarly to first communication signal 110 of FIG. 1, first communication signal 812 may transmitted from first computer system 102 through first communication link 122, network 116, and second communication link 124, to second computer system 104. First communication signal 812 may be transmitted in any form, including in the form of a stream of packets (e.g., IP packets). Second computer system 104 receives first communication signal 812.

Second agent 108 processes request 810 included in first communication signal 812. For example, request 810 may be a request for resource 120a stored in storage 114 associated with second computer system 104. Second agent 108 retrieves resource 120a from storage 114 to include in a response. Resource 120a is structured according to a second data type different from the first (open) data type associated with request 308. The second data type may be similar to the first open data type in that it includes the one or more predetermined properties 302 defined in open data type 300 in FIG. 3. Furthermore, the second data type includes one or more additional properties.

For instance, an example of the first data type (at first computer system 102) is shown as follows in a generic form:

```
[open] type ClientCustomer
    Name: string
    Phone: string
    LastContactDate: date
    Priority: integer
```

As shown above, the first data type is an open data type, having the data type name of "ClientCustomer" and four properties of "Name," "Phone," "LastContactDate," and "Priority," which are predetermined properties 302. An example of the second data type (at second computer system 104) is shown as follows in generic form:

```
type ServerCustomer
    Name: string
    Phone: string
    LastContactDate: date
    Priority: integer
    PrimaryContact: string
```

As shown above, the second data type has the data type name of "ServerCustomer" and five properties of "Name," "Phone," "LastContactDate," "Priority," and "PrimaryContact." The four properties "Name," "Phone," "LastContactDate," "Priority," match the predetermined properties of the first data type. "PrimaryContact," however is not a predetermined property of the first data type, and is an additional property. As described as follows, the "PrimaryContact" property is considered to be an extension property to the first data type.

Continuing the current example, resource 120a may be structured at second computer system 104 according to the ServerCustomer data type. For instance, Table 1 below shows example values for the corresponding property names of the ServerCustomer data type:

TABLE 1

| Property Name | Data Value |
|---|---|
| Name | Company One |
| Phone | 111-222-3333 |
| LastContactDate | Jul. 12, 2008 |
| Priority | 2 |
| PrimaryContact | John Doe |

Second agent 108 may convert resource 120a from the second data type to a data format that may be transmitted from computer system 104 (e.g., a wire format), in a manner that would be known to persons skilled in the relevant art(s). For instance, an example wire format may have XML (extensible markup language) format, Javascript Object Notation (JSON), or other suitable format. Continuing the current example, where resource 120a has the values shown in Table 1, second agent 108 may convert resource 120a to JSON format as follows:

```
{
    __metadata: { type: 'ServerCustomer' },
    Name: 'Company One',
    Phone: '111-222-3333',
    LastContactDate: '\/date(7-12-08)\/',
    Priority: 2,
    PrimaryContact: 'John Doe'
}
```

Although in the current example, resource 120a is shown as a single "ServerCustomer" data item, additional "ServerCustomer" data items may be included in the above expression if resource 120a includes further "ServerCustomer" data items.

In an embodiment, representations used to exchange instances of data types (e.g. through network 116) may use the same structure and format for predetermined properties and extension properties (e.g., as shown above). This enables decoupling between communicating nodes (e.g., first and second computer systems 102 and 104) because each node can have a different perspective on which properties are statically defined in a type (predefined properties) versus what properties are extension properties. This applies to representations exchanged in both directions, as a result of query operations (described further below) and insert, update, and delete operations. In this manner, a standard serialization format/wire format may be used to transmit instances of open data types within including information including which properties are extension properties.

Second computer system 104 in FIG. 1 generates second communication signal 814 (shown in FIG. 8), which is a response signal that includes the requested resource 120a and may optionally include an indication of the second data type (used for resource 120a at second computer system 104). Similarly to second communication signal 112 of FIG. 1, second communication signal 814 may be transmitted through second communication link 124, network 116, and first communication link 122, and is received by first computer system 102. Second communication signal 814 may be transmitted in any form, including in the form of a stream of packets (e.g., IP packets).

Referring to FIG. 9, in step 906, the resource is received from the second computer system. As shown in FIG. 8, second communication signal 814 is received by network interface 804 of first computer system 102 from second computer system 104. Second communication signal 814 includes the requested resource provided by second agent 108, which in the current example is resource 120a. Network interface 804 outputs a network-transportable resource 816 extracted from second communication signal 814, which is a network transportable version of resource 120a (e.g., as shown above in JSON format for the current example).

In step 908, the received resource is materialized into an instance of the first data type, the materialized instance of the first data type including a plurality of name/value pairs corresponding to the plurality of properties and a name/value pair associated with the additional property. In an embodiment, materialization module 806 shown in FIG. 8 is configured to materialize the received resource into an instance of the first data type. As shown in FIG. 8, materialization module 806 receives network-transportable resource 816. Furthermore, materialization module 806 receives a first data type indication 818, which is provided by data request module 802 (from request 808), and receives local data type definitions 822, which includes data types of first computer system 102. Materialization module 806 materializes network-transportable resource 816 into an instance of the first data type, the definition of which is selected from local data type definitions 822 (according to the data type indicated by first data type indication 818).

Figure 11:
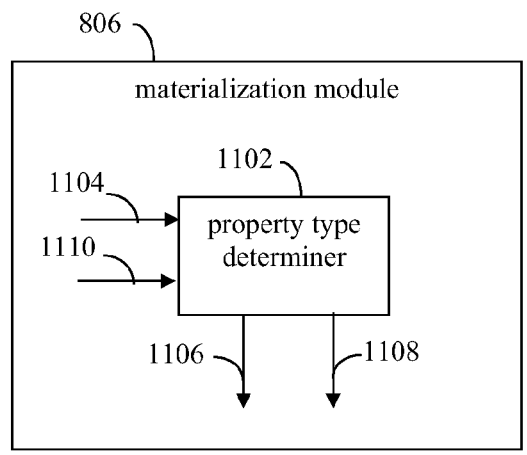
FIG. 11 shows a block diagram of materialization module, according to an example embodiment.

In an embodiment, materialization module 806 is configured to indicate which properties of the materialized instance of the first data type are predetermined properties and extension properties. For example, FIG. 11 shows a block diagram of materialization module 806, according to an example embodiment. As shown in FIG. 11, materialization module 806 includes a property type determiner 1102. Property type determiner 1102 receives a materialized instance of network-transportable resource 816, and indicates the properties of the materialized instance as predetermined properties or extension properties. As shown in FIG. 11, property type determiner 1102 receives a first data type definition 1110, which is a definition of the open data type, which may indicate the predetermined properties (predetermined properties 302) for the open data type. Property type determiner 1102 compares the properties of the materialized instance to the predetermined properties indicated by first data type definition 1110. Any properties that match between the materialized instance and first data type definition 1110 are indicated as predetermined properties 1106. Any additional properties that do not match between the materialized instance and first data type definition 1110 are indicated as extension properties 1108. As such, first computer system 102 may be "open" to receiving open data types. Note that in another embodiment, even if a materialized instance does not include additional properties, first computer system 102 may associate the materialized instance with an open data type. In still another embodiment, first computer system 102 may be configured to be "closed" to open data types, and thus may ignore additional properties received in a materialized instance that are not include in first data type definition 1110.

For example, continuing the current example, resource 120a having the format shown in Table 1 above may be converted to an instance of the ClientCustomer data type shown above, as indicated in Table 2 below:

TABLE 2

| Property Type | Property Name | Data Value |
|---|---|---|
| predetermined | Name | Company One |
| predetermined | Phone | 111-222-3333 |
| predetermined | LastContactDate | Jul. 12, 2008 |
| predetermined | Priority | 2 |
| extension | PrimaryContact | John Doe |

As shown in Table 2, the four properties "Name," "Phone," "LastContactDate," and "Priority" are predetermined properties of the ClientCustomer data type, the definition of which was received by materialization module 806 on local data type definitions 822. Property type determiner 1102 determines a match between these four properties of the materialized instance of resource 120a and the ClientCustomer data type (first data type definition 1110), and indicates these four properties as predetermined properties 1106. "PrimaryContact" is not included as a predetermined property of the ClientCustomer data type. Property type determiner 1102 determines that a match does not exist between the materialized instance of resource 120a and the ClientCustomer data type, and "PrimaryContact" is therefore indicated as an extension property 1108.

In step 910, the instance of the first data type is stored in a database, including storing the name/value pair in the database as an extension property to the open data type. In an embodiment, the materialized instance of the first data type may be stored in storage 114 by materialization module 806 as resource 820, as shown in FIG. 8. As shown in FIG. 8, resource 820 includes predetermined property name/value pair(s) 824 and extension property name/value pair(s) 826. Predetermined property name/value pair(s) 824 includes the property name and data value pairs corresponding to the one or more predetermined properties of the open data type (as indicated by predetermined properties 1106 in FIG. 11). For example, in the current example, predetermined property name/value pair(s) 824 may include the name/value pairs of "Name," "Company One"; "Phone," "111-222-3333"; "LastContactDate," "7-12-08"; and "Priority," "2". Extension property name/value pair(s) 826 includes the property name and data value pairs corresponding to the one or more extension properties to the open data type (as indicated by extension properties 1108). For example, in the current example, extension property name/value pair(s) 826 may include the name/value pair of "PrimaryContact," "John Doe."

Open data types enable computer systems 102 and 104 to be loosely coupled, because they do not need to maintain exact consistency between data types. First and second computer systems 102 and 104 can maintain independent data types that match each other to the extent that is required for them to operate, by using extension properties, as described herein.

Figure 12:
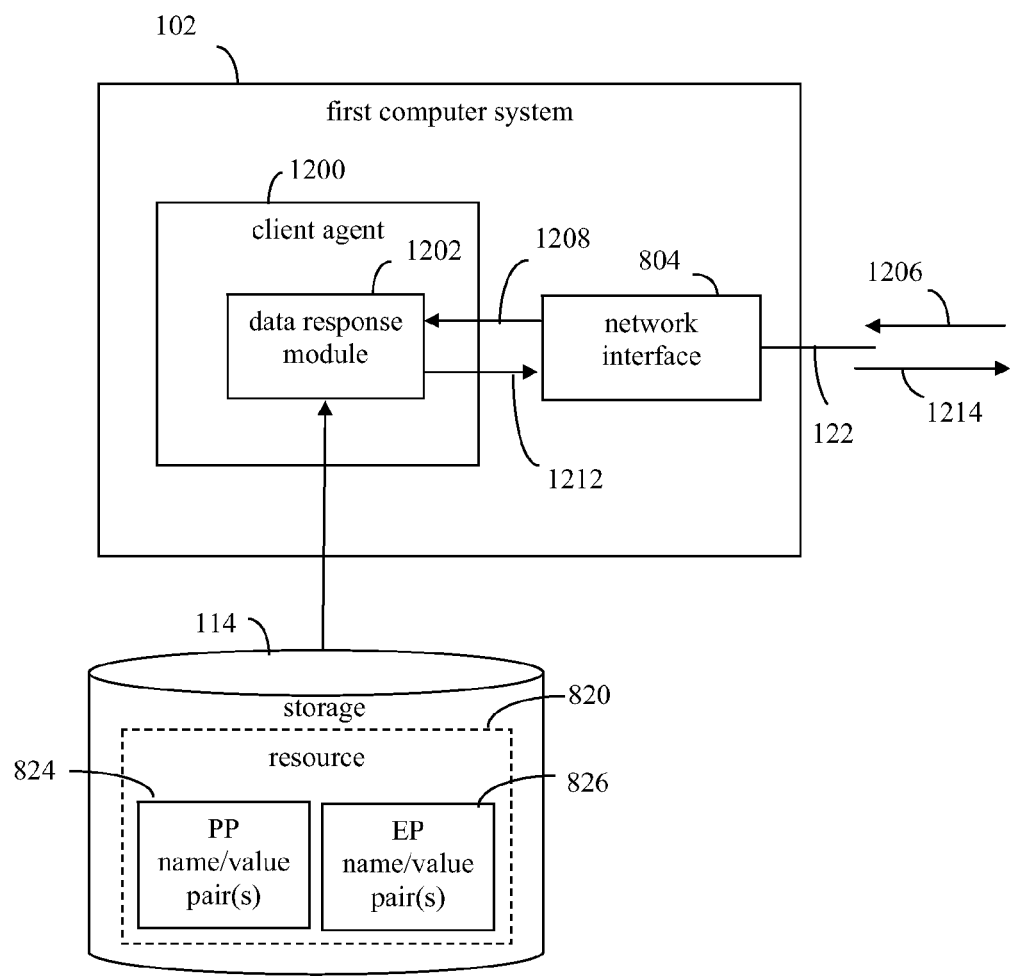
FIG. 12 shows a block diagram of a computer system configured to receive data requests, according to an example embodiment.
Figure 13:
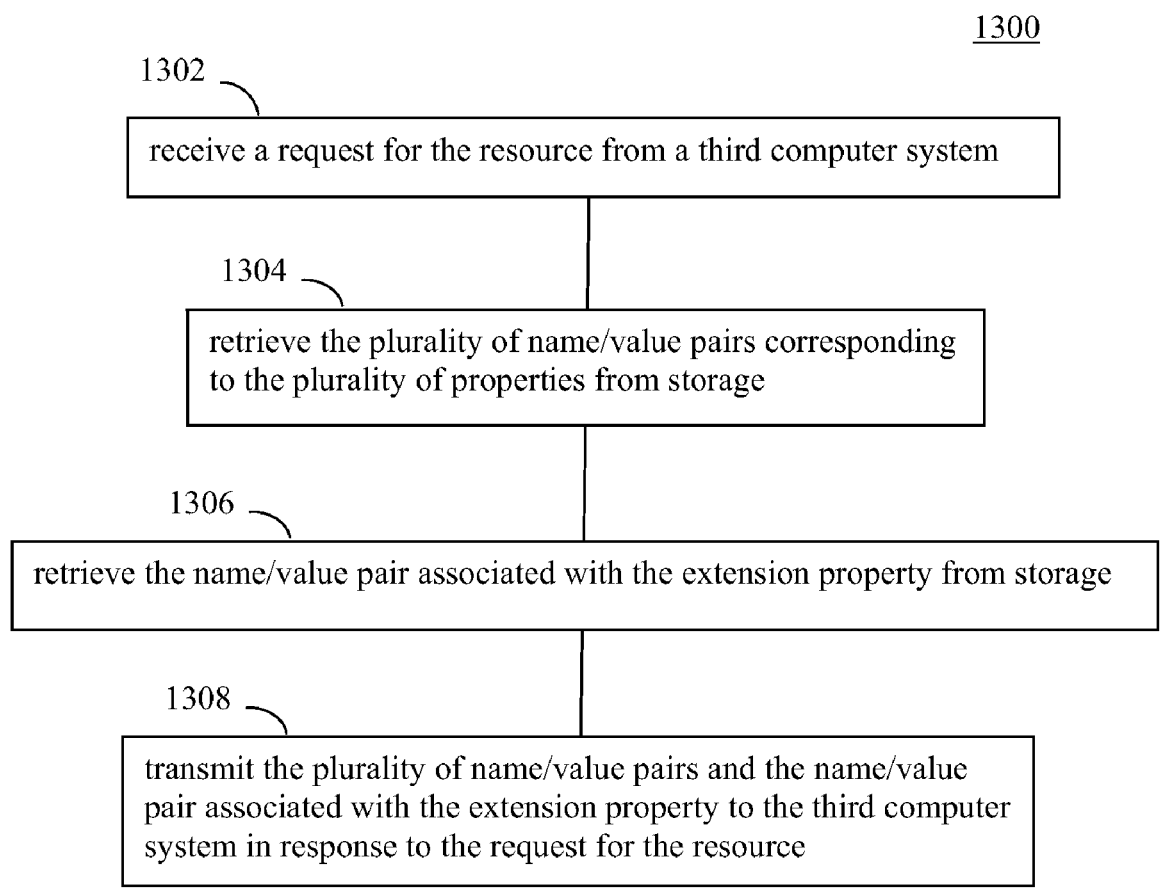
FIG. 13 shows a flowchart for a data communication between first and second computer systems, according to an example embodiment.

B. Example Embodiments for Processing Requests for Resources Materialized as Instances of Open Data Types Computer systems may be configured in various ways to process requests for resources that are instances of open data types. For instance, FIG. 12 shows a block diagram of first computer system 102, according to an example embodiment of the present invention. As shown in FIG. 12, first computer system 102 includes a client agent 1200 and a network interface 804. Client agent 1200 is an example of open data type processing module 702 shown in FIG. 7. Client agent 1200 is configured to enable first computer system 102 to receive requests for resources configured according to open data types from second computer system 104 and/or from further computer systems. As shown in FIG. 12, client agent 1200 includes a data response module 1202. Client agent 1200 is described with respect to FIG. 13. FIG. 13 shows a flowchart 1300 for a data communication between a first agent (e.g., client agent 1200) and a second agent (e.g., second agent 108 of FIG. 1), according to an example embodiment. Further structural and operational embodiments will be apparent to persons skilled in the relevant art(s) based on the discussion regarding flowchart 1300. Flowchart 1300 is described as follows.

In step 1302, a request is received for the resource from a third computer system. For example, as shown in FIG. 12, a first communication signal 1206 is received by network interface 804 of first computer system 102 from a remote computer system, which may be second computer system 104 or another computer system. First communication signal 1206 includes a request for resource 820. Network interface 804 outputs the request received in first communication signal 1206 as request signal 1208, which is received by data response module 1202.

In step 1304, a plurality of name/value pairs corresponding to the plurality of properties is retrieved from storage. For example, in an embodiment, data response module 1202 is configured to retrieve predetermined property name/value pair(s) 824 from storage 114, which are associated with resource 820.

In step 1306, the name/value pair associated with the extension property is retrieved from storage. For example, in an embodiment, data response module 1202 is configured to retrieve extension property name/value pair(s) 826 from storage 114, which are associated with resource 820.

In step 1308, the plurality of name/value pairs and the name/value pair associated with the extension property are transmitted to the third computer system in response to the request for the resource. In an embodiment, data response module 1202 may be configured to dematerialize resource 820 (including predetermined property name/value pair(s) 824 and extension property name/value pair(s) 826) to a network-transportable form that includes predetermined property name/value pair(s) 824 and extension property name/value pair(s) 826. As shown in FIG. 12, data response module 1202 generates a network-transportable resource 1212. Network-transportable resource 1212 may include an identification of the open data type, and includes predetermined property name/value pair(s) 824 and extension property name/value pair(s) 826.

Network-transportable resource 1212 is received by network interface 804, which transmits network-transportable resource 1212 from first computer system 102 as a second communication signal 1214. For example, second communication signal 1214 may be transmitted through first communication link 122, network 116, and second communication link 124 to second computer system 104 (or other computer system that provided the request). Second communication signal 1214 may be transmitted in any form, including in the form of a stream of packets (e.g., IP packets).

Although first computer system 102 may not recognize data associated with extension properties 304 (e.g., extension property name/value pair(s) 826) as part of open data type 300, because open data type 300 is an open data type, first computer system 102 treats extension property name/value pair(s) 826 corresponding to extension properties 304 as being included in resource 820. At second computer system 104 (or other computer system) that receives network-transportable resource 1212, the received resource may be associated with a non-open data type or an open data type. Thus, extension property name/value pair(s) 826 included in the received resource may be considered predetermined properties (e.g., of an open or non-open data type) or as extension properties (e.g., of an open data type), depending on the data type associated with the received resource at second computer system 104.

Figure 14:
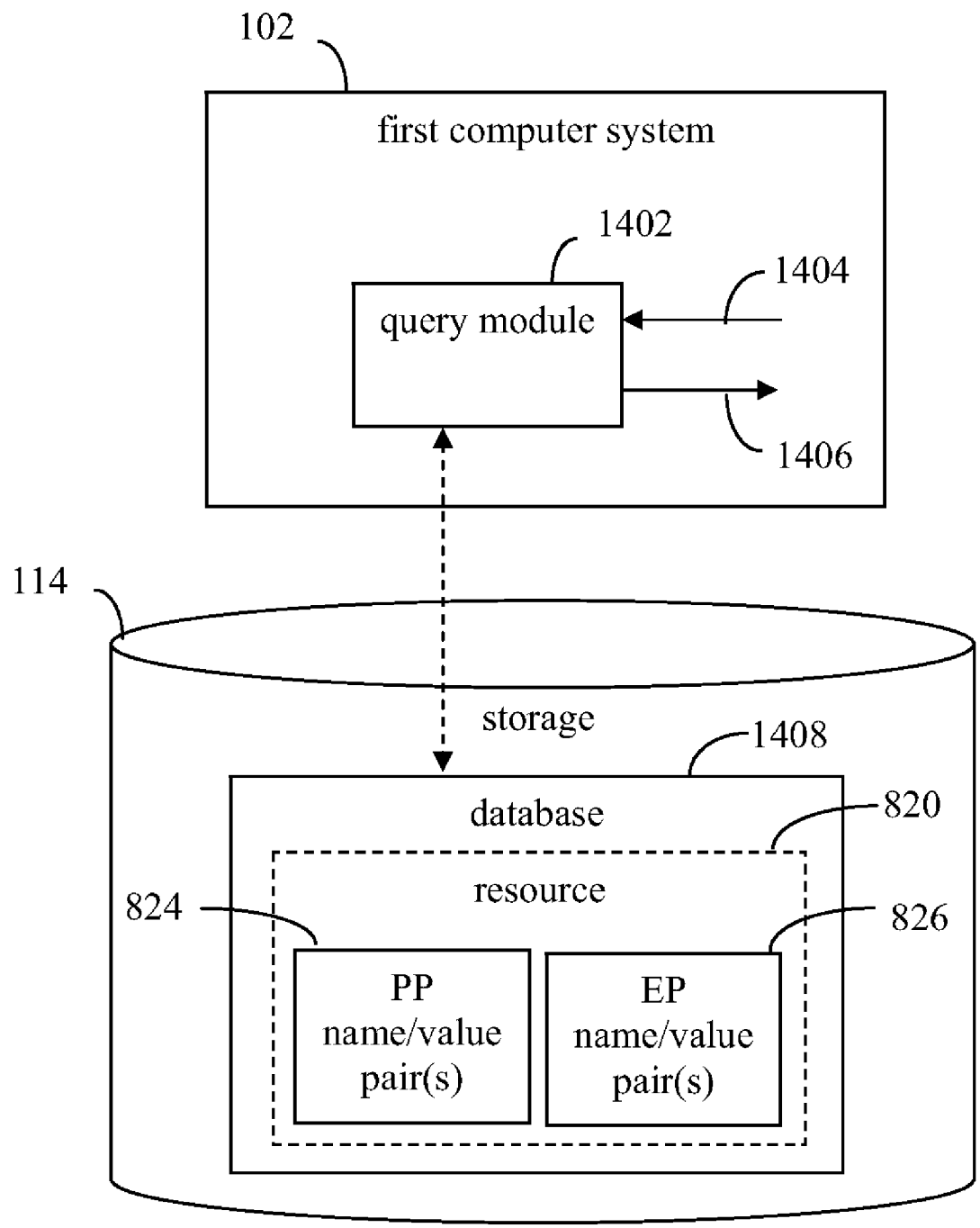
FIG. 14 shows a block diagram of a computer system configured to process queries, according to an example embodiment.
Figure 15:
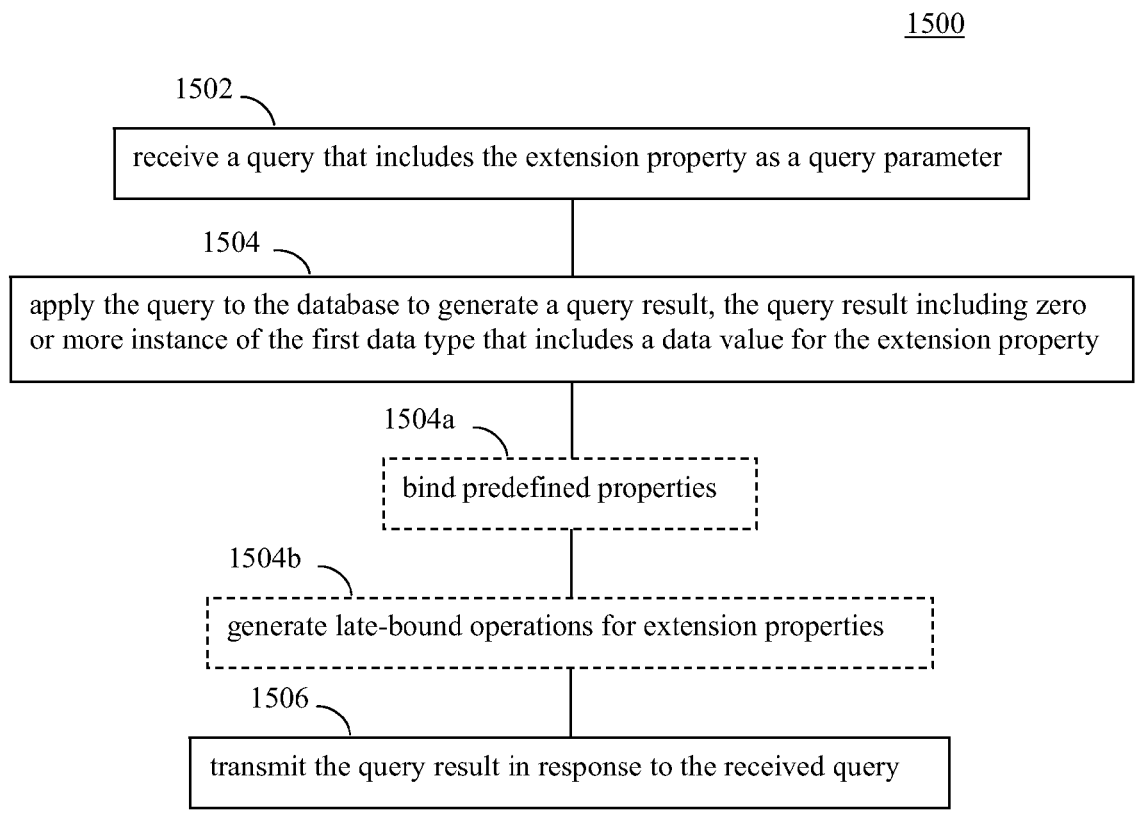
FIG. 15 shows a flowchart for processing a received query, according to an example embodiment.

C. Example Embodiments for Processing Queries for Resources Materialized as Instances of Open Data Types Computer systems may be configured in various ways to process queries over resources that are instances of open data types. For instance, FIG. 14 shows a block diagram of first computer system 102, according to an example embodiment of the present invention. As shown in FIG. 14, first computer system 102 includes a query module 1402. Query module 1402 is configured to enable first computer system 102 to process queries over resources configured according to open data types. Query module 1402 is configured to handle queries such that a syntax of the queries is uniform across both predefined properties and extension properties. As such, computer systems (e.g., first and second computer systems 104) do not need to coordinate with each other on what data types are considered to be open or not open, and which properties are considered to be extension properties. Query module 1402 is described with respect to FIG. 15. FIG. 15 shows a flowchart 1500 for processing a received query, according to an example embodiment. Further structural and operational embodiments will be apparent to persons skilled in the relevant art(s) based on the discussion regarding flowchart 1500. FIG. 14 and flowchart 1500 are described as follows.

In step 1502, a query is received that includes the extension property as a query parameter. For example, as shown in FIG. 14, query module 1402 receives a query 1404. Query 1404 is a query intended to be run over resources contained in a database 1408 stored in storage 114. Database 1408 may store any number of resources, including resource 820. Query 1404 may be received from any source, including from an application running on first computer system 102, from second computer system 104 (e.g., received using network interface 804), or other computer system. Query 1404 includes one or more extension properties 304 as a query parameter, and may include one or more predefined properties 302 as query parameters. For example, query 1404 may include one or more data values for extension properties of open data types associated with resources stored in database 1408. The data values may be used in expressions that are used to filter, sort, and otherwise process resources stored in database 1408.

In step 1504, the query is applied to the database to generate a query result, the query result including zero or more instances of the first data type that include a data value for the extension property. As shown in FIG. 14, query module 1402 may apply query 1404 to database 1408 to generate a query result 1406. Query result 1406 includes the results of applying query 1404 to database 1408, such as one or more resources that fulfill the query expressions of query 1404. Query module 1402 may be configured to apply queries to database 1408 in a manner known to persons skilled in the relevant art(s), with the addition of being enabled to apply queries against extension properties.

For instance, referring to the example shown further above, resource 820 in database 1408 may be configured as shown in Table 3 below (repeated from Table 2 above) according to the "ClientCustomer" open data type:

TABLE 3

| Property Type | Property Name | Data Value |
|---|---|---|
| predetermined | Name | Company One |
| predetermined | Phone | 111-222-3333 |
| predetermined | LastContactDate | Jul. 12, 2008 |
| predetermined | Priority | 2 |
| extension | PrimaryContact | John Doe |

In the current example, query 1404 may include query parameters/expressions such as "Priority>1" and "PrimaryContact='John Doe.'" In this example, "PrimaryContact" is an extension property and "Priority" is a predefined property. Query module 1402 may apply these query parameters/expressions to database 1408 to generate filtered data as query result 1406. Any number of resources in database 1408 may match query 1404, and may be included in query result 1406. For example, with regard to resource 820 of Table 3, the predetermined property "Priority" has a value of 2, and thus is ">1" and the extension property "PrimaryContact" has a value of "John Doe," and thus is "='John Doe.'" As such, resource 820 may be included in query result 1406. If resource 820 of Table 3 did not match the query parameters of query 1404, resource 820 would not be included in query result 1406.

It is noted that database 1408 may store resources of an open data type, such as the "ClientCustomer" open data type, that do not include an extension property that is being queried against by query 1404. For example, a second resource of the "Client Customer" open data type may be stored in database 1408 that includes a data value for only the predetermined properties of "Name," "Phone," "LastContactDate," and "Priority." A third resource of the "Client Customer" open data type may be stored in database 1408 that includes a data value for each of the predetermined properties of "Name," "Phone," "LastContactDate," and "Priority," and includes a data value for an extension property of "SecondaryContact." As such, query 1404 may include a query parameter of the extension property of "PrimaryContact," but no "PrimaryContact" extension property is included in the second and third resources. In an embodiment, instances of resources stored in database 1408 that do not include extension properties included in query parameters may be handled as if the extension properties are present, but have "null," empty string, or other indications that a value for an extension property is not present. For example, the second and third resources may each be provided with a "null" value for the "PrimaryContact" extension property in addition to their respective properties. Because the behavior of queries with respect to properties having "null" value is typically well defined in most query systems, known semantics and uniform query models may be applied by query module 1402 to both predefined and extension properties.

In this manner, query module 1402 may be configured according to a query model that surfaces regular and extension properties in the same way from the query formulation perspective. This reduces the coupling between nodes (e.g., between first and second computer systems 102 and 104) by not requiring a node (e.g., second computer system 104) that formulates query 1404 to know whether any given property is an extension property or a predetermined property. As just described, because extension properties may not be present in all instances, query module 1402 may be configured with a behavior (e.g., treating non-present extension properties as present, but "null") to be applied when a given query operation is to be evaluated against an instance that does not include a given extension property.

FIG. 15 shows steps 1504*a* and 1504*b* that may operationally be performed during translation of query 1404 during step 1504, in an example embodiment. In step 1504*a*, predefined properties are binded. In step 1504*b*, late-bound operations are generated for extension properties.

In step 1506, the query result is transmitted in response to the received query. For example, as shown in FIG. 14, query module 1402 transmits query result 1406. Query result 1406 may be transmitted to the source of query 1404, such as to an application running on first computer system 102, to second computer system 104 (e.g., transmitted using network interface 804), or to other computer system.

III Further Example Embodiments

Open data type processing module 702, client agent 800, data request module 802, materialization module 806, property type determiner 1102, client agent 1200, data response module 1202, and query module 1402 may be implemented in hardware, software, firmware, or any combination thereof. For example, open data type processing module 702, client agent 800, data request module 802, materialization module 806, property type determiner 1102, client agent 1200, data response module 1202, and/or query module 1402 may be implemented as computer program code configured to be executed in one or more processors. Alternatively, open data type processing module 702, client agent 800, data request module 802, materialization module 806, property type determiner 1102, client agent 1200, data response module 1202, and/or query module 1402 may be implemented as hardware logic/electrical circuitry.

Figure 16:
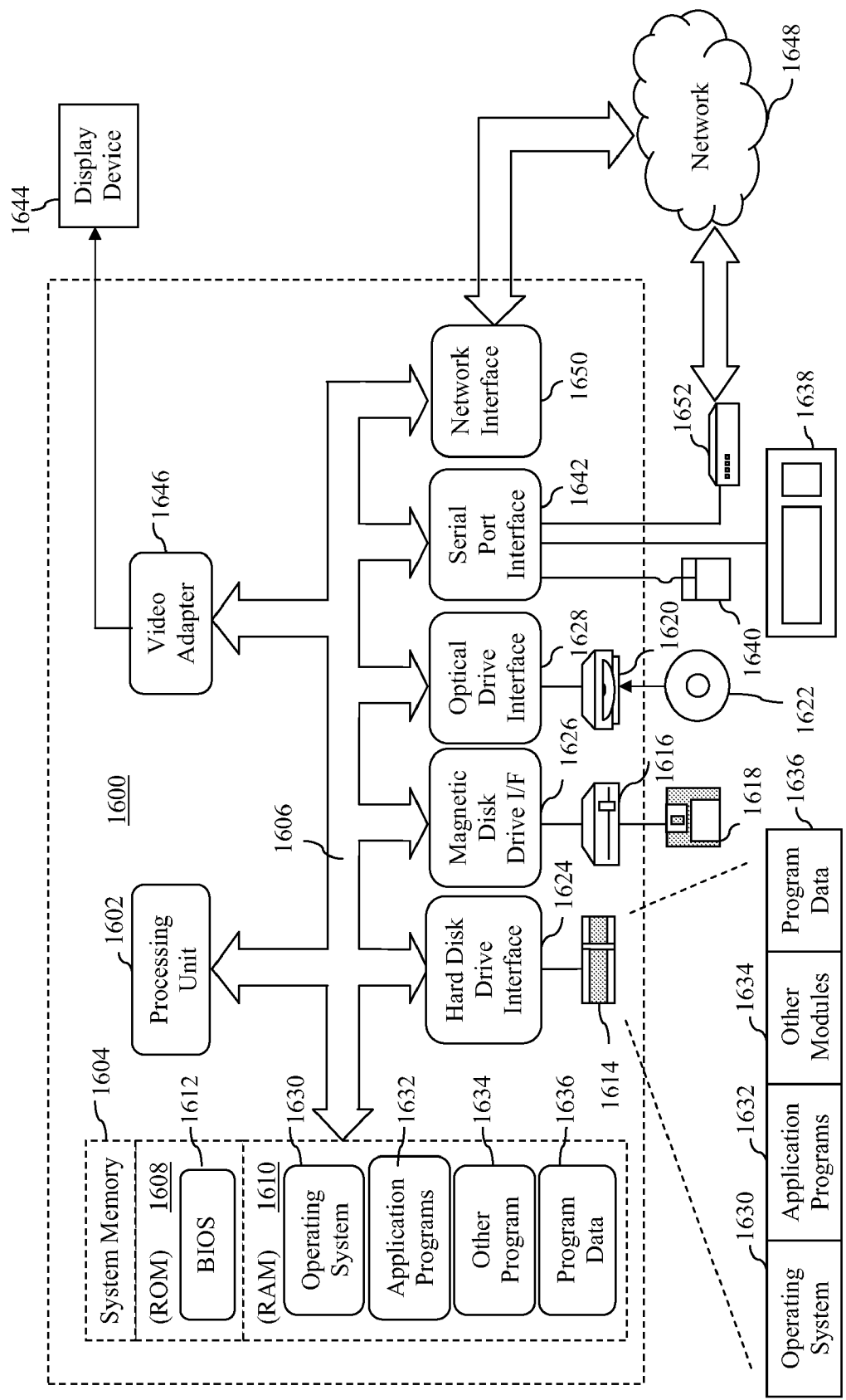
FIG. 16 shows a block diagram of an example computer that may be used to implement embodiments of the present invention.

FIG. 16 depicts an exemplary implementation of a computer 1600 in which embodiments of the present invention may be implemented. For example, computer systems 102, 104, 500, and 700 may each be implemented similarly to computer 1600, including one or more features of computer 1600 and/or alternative features. Computer 1600 may be a general-purpose computing device in the form of a conventional personal computer, a mobile computer, or a workstation, for example, or computer 1600 may be a special purpose computing device. The description of computer 1600 provided herein is provided for purposes of illustration, and is not intended to be limiting. Embodiments of the present invention may be implemented in further types of computer systems, as would be known to persons skilled in the relevant art(s).

As shown in FIG. 16, computer 1600 includes a processing unit 1602, a system memory 1604, and a bus 1606 that couples various system components including system memory 1604 to processing unit 1602. Bus 1606 represents one or more of any of several types of bus structures, including a memory bus or memory controller, a peripheral bus, an accelerated graphics port, and a processor or local bus using any of a variety of bus architectures. System memory 1604 includes read only memory (ROM) 1608 and random access memory (RAM) 1610. A basic input/output system 1612 (BIOS) is stored in ROM 1608.

Computer 1600 also has one or more of the following drives: a hard disk drive 1614 for reading from and writing to a hard disk, a magnetic disk drive 1616 for reading from or writing to a removable magnetic disk 1618, and an optical disk drive 1620 for reading from or writing to a removable optical disk 1622 such as a CD ROM, DVD ROM, or other optical media. Hard disk drive 1614, magnetic disk drive 1616, and optical disk drive 1620 are connected to bus 1606 by a hard disk drive interface 1624, a magnetic disk drive interface 1626, and an optical drive interface 1628, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1630, one or more application programs 1632, other program modules 1634, and program data 1636. Application programs 1632 or program modules 1634 may include, for example, computer program logic for implementing open data type processing module 702, client agent 800, data request module 802, materialization module 806, property type determiner 1102, client agent 1200, data response module 1202, query module 1402, flowchart 600, flowchart 900, flowchart 1300 and/or flowchart 1500 (including any step of flowcharts 600, 900, 1300, and/or 1500).

A user may enter commands and information into the computer 1600 through input devices such as keyboard 1638 and pointing device 1640. Other input devices (not shown) may include a microphone, joystick, game pad, satellite dish, scanner, or the like. These and other input devices are often connected to the processing unit 1602 through a serial port interface 1642 that is coupled to bus 1606, but may be connected by other interfaces, such as a parallel port, game port, or a universal serial bus (USB).

A display device 1644 is also connected to bus 1606 via an interface, such as a video adapter 1646. In addition to the monitor, computer 1600 may include other peripheral output devices (not shown) such as speakers and printers.

Computer 1600 is connected to a network 1648 (e.g., the Internet) through an adaptor or network interface 1650, a modem 1652, or other means for establishing communications over the network. Modem 1652, which may be internal or external, is connected to bus 1606 via serial port interface 1642.

As used herein, the terms "computer program medium" and "computer-readable medium" are used to generally refer to media such as the hard disk associated with hard disk drive 1614, removable magnetic disk 1618, removable optical disk 1622, as well as other media such as flash memory cards, digital video disks, random access memories (RAMs), read only memories (ROM), and the like.

As noted above, computer programs and modules (including application programs 1632 and other program modules 1634) may be stored on the hard disk, magnetic disk, optical disk, ROM, or RAM. Such computer programs may also be received via network interface 1650 or serial port interface 1642. Such computer programs, when executed or loaded by an application, enable computer 1600 to implement features of embodiments of the present invention discussed herein. Accordingly, such computer programs represent controllers of the computer 1600.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

IV. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a first computer system, comprising:
    associating a first data type with a request for a resource, the first data type being an open data type that includes a plurality of properties;
    transmitting the request for the resource to a second computer system, the resource being instantiated at the second computer system according to a second data type that is different from the first data type, the second data type including the plurality of properties and an additional property;
    receiving the resource from the second computer system;
    materializing the received resource into an instance of the first data type, the materialized instance of the first data type including a plurality of name and value pairs corresponding to the plurality of properties and a name and value pair associated with the additional property; and
    storing the instance of the first data type in a database, said storing including storing the name and value pair associated with the additional property in the database as an extension property to the open data type.

2. The method of claim 1, further comprising:
    receiving a query that includes the extension property as a query parameter; and
    applying the query to the database to generate a query result, the query result including at least one instance of the first data type that includes a data value for the extension property.

3. The method of claim 2, further comprising:
    transmitting the query result in response to the received query.

4. The method of claim 2, wherein a syntax of the query is a uniform syntax across predefined properties and extension properties.

5. The method of claim 1, further comprising:
    receiving a request for the resource from a third computer system; and
    transmitting the resource to the third computer system in response to the request for the resource received from the third computer system, including transmitting the plurality of name and value pairs corresponding to the plurality of properties and the name and value pair associated with the additional property.

6. The method of claim 1, wherein the second data type is an open data type.

7. The method of claim 1, wherein the second data type is unknown to the first computer system.

8. The method of claim 1, wherein said receiving the resource from the second computer system comprises:
receiving the resource according to a wire format that does not distinguish extension properties from predefined properties.

9. A first computer system, comprising:
at least one processor;
a data request module configured to receive a request for a resource, the request having an associated first data type, the first data type being an open data type that includes a plurality of properties, the resource being instantiated at a second computer system according to a second data type that is different from the first data type, the second data type including the plurality of properties and an additional property; and
a materialization module that receives the resource from the second computer in response to the request being transmitted from the first computer system, and that is configured to materialize, using the at least one processor, the received resource into an instance of the first data type that includes a plurality of name and value pairs corresponding to the plurality of properties and a name and value pair associated with the additional property.

10. The first computer system of claim 9, further comprising:
a storage;
the materialization module being configured to store the instance of the first data type in a database, including being configured to store the name and value pair associated with the additional property in the database as an extension property to the open data type.

11. The first computer system of claim 10, further comprising:
a query module configured to receive a query that includes the extension property as a query parameter and to apply the query to the database to generate a query result, the query result including at least one instance of the first data type that includes a data value for the extension property.

12. The first computer system of claim 9, further comprising:
a data response module configured to receive a request for the resource from a third computer system and to transmit the resource to the third computer system in response to the request for the resource received from the third computer system, the data response module being configured to transmit the plurality of name and value pairs corresponding to the plurality of properties and the name and value pair associated with the extension property.

13. The first computer system of claim 9, wherein the second data type is an open data type.

14. The first computer system of claim 9, wherein the second data type is unknown to the first computer system.

15. A computer program product comprising a computer-readable storage medium having computer program logic recorded thereon for enabling a processor to perform a data communication, comprising:
first computer program logic means for enabling the processor to associate a first data type with a request for a resource, the first data type being an open data type that includes a plurality of properties;
second computer program logic means for enabling the processor to transmit the request for the resource to a second computer system, the resource being instantiated at the second computer system according to a second data type that is different from the first data type, the second data type including the plurality of properties and an additional property;
third computer program logic means for enabling the processor to materialize the received resource into an instance of the first data type, the materialized instance of the first data type including a plurality of name and value pairs corresponding to the plurality of properties and a name and value pair associated with the additional property; and
fourth computer program logic means for enabling the processor to store the instance of the first data type in a database, said fourth computer program logic means being configured to store the name and value pair associated with the additional property in the database as an extension property to the open data type.

16. The computer program product of claim 15, further comprising:
fifth computer program logic means for enabling the processor to receive a query that includes the extension property as a query parameter; and
sixth computer program logic means for enabling the processor to apply the query to the database to generate a query result, the query result including at least one instance of the first data type that includes a data value for the extension property.

17. The computer program product of claim 16, further comprising:
seventh computer program logic means for enabling the processor to transmit the query result in response to the received query.

18. The computer program product of claim 15, further comprising:
fifth computer program logic means for enabling the processor to receive a request for the resource from a third computer system; and
sixth computer program logic means for enabling the processor to transmit the resource to the third computer system in response to the request for the resource received from the third computer system, the sixth computer program logic means including computer program logic means for enabling the processor to transmit a plurality of name and value pairs corresponding to the plurality of properties and the name and value pair associated with the extension property.

19. The computer program product of claim 15, wherein the second data type is an open data type.

20. The computer program product of claim 15, wherein the second data type is unknown to the first computer system.

* * * * *